United States Patent
Wada

(10) Patent No.: US 9,983,700 B2
(45) Date of Patent: May 29, 2018

(54) INPUT DEVICE, IMAGE DISPLAY METHOD, AND PROGRAM FOR RELIABLE DESIGNATION OF ICONS

(75) Inventor: Masako Wada, Kanagawa (JP)

(73) Assignee: NEC Corporation, Tokyo (JP)

( * ) Notice: Subject to any disclaimer, the term of this patent is extended or adjusted under 35 U.S.C. 154(b) by 206 days.

(21) Appl. No.: 14/232,532

(22) PCT Filed: Jun. 26, 2012

(86) PCT No.: PCT/JP2012/066228
§ 371 (c)(1),
(2), (4) Date: Jan. 13, 2014

(87) PCT Pub. No.: WO2013/008615
PCT Pub. Date: Jan. 17, 2013

(65) Prior Publication Data
US 2014/0139475 A1    May 22, 2014

(30) Foreign Application Priority Data
Jul. 14, 2011    (JP) .................................. 2011-155719

(51) Int. Cl.
*G06F 3/041* (2006.01)
*G06F 3/0488* (2013.01)

(52) U.S. Cl.
CPC ............ *G06F 3/041* (2013.01); *G06F 3/0416* (2013.01); *G06F 3/04883* (2013.01); *G06F 2203/04808* (2013.01)

(58) Field of Classification Search
None
See application file for complete search history.

(56) References Cited

U.S. PATENT DOCUMENTS 6,211,856 B1 * 4/2001 Choi ...................... G06F 3/0481
                                                              345/173
6,765,557 B1 * 7/2004 Segal .................... G06F 3/0488
                                                              345/173
(Continued)

FOREIGN PATENT DOCUMENTS

JP         9-222972 A     8/1997
JP        11-039093 A     2/1999
(Continued)

OTHER PUBLICATIONS

International Search Report corresponding to International Application No. PCT/JP2012/066228, dated Sep. 25, 2012, 3 pages.
(Continued)

*Primary Examiner* — Ilana Spar
*Assistant Examiner* — Kirk Hermann
(74) *Attorney, Agent, or Firm* — Wilmer Cutler Pickering Hale and Dorr LLP

(57) ABSTRACT

An input device includes: a screen (11) that displays images on a screen portion; a touch pad (12) that receives designation of in-plane positions with respect to the screen and supplies, as output, position signals that indicate the designated in-plane positions; and a control unit (10) that, when a plurality of in-plane positions has been designated, specifies each in-plane position on the basis of the position signals and both displays a plurality of images at the in-plane positions and controls the size of the display of each image in accordance with the spacing between the in-plane positions.

7 Claims, 6 Drawing Sheets

(56) References Cited

U.S. PATENT DOCUMENTS

| | | | |
|---|---|---|---|
| 2004/0021704 A1 | 2/2004 | Mitsutake | |
| 2008/0189658 A1* | 8/2008 | Jeong | G06F 3/0482 715/810 |
| 2011/0115711 A1* | 5/2011 | Gunawan | G06F 1/1626 345/169 |
| 2012/0062465 A1* | 3/2012 | Spetalnick | G06F 3/0236 345/168 |
| 2012/0144337 A1* | 6/2012 | Archer | G06F 3/04886 715/773 |
| 2013/0120278 A1* | 5/2013 | Cantrell | G06F 3/04886 345/173 |

FOREIGN PATENT DOCUMENTS

| | | | |
|---|---|---|---|
| JP | 11039093 A * | 2/1999 | |
| JP | 2004-013381 A | 1/2004 | |
| JP | 2004-062867 A | 2/2004 | |
| JP | 2004-295716 A | 10/2004 | |
| JP | 2007156866 A | 6/2007 | |
| JP | 2007-256338 A | 10/2007 | |
| JP | 2007-328421 A | 12/2007 | |
| JP | 2008-108233 A | 5/2008 | |
| JP | 2009-301094 A | 12/2009 | |
| JP | 2010-146032 A | 7/2010 | |
| JP | 2010-146506 A | 7/2010 | |
| WO | WO-2009/031214 A1 | 3/2009 | |
| WO | WO-2009/147901 A1 | 12/2009 | |

OTHER PUBLICATIONS

Japanese Office Action issued in corresponding Japanese Application No. 2013-523877, dated Jan. 19, 2016, 4 pages.

Japanese Office Action issued by the Japan Patent Office for Japanese Application No. 2013-523877 dated Oct. 13, 2015 (5 pages).

* cited by examiner

INPUT DEVICE, IMAGE DISPLAY METHOD, AND PROGRAM FOR RELIABLE DESIGNATION OF ICONS

CROSS-REFERENCE TO RELATED APPLICATIONS

This application is a national stage Application of International Application No. PCT/JP2012/066228 entitled "Input Device, Image Display Method, and Program," filed on Jun. 26, 2012, which claims the benefit of the priority of Japanese Patent Application No. 2011-155719, filed on Jul. 14, 2011, the disclosures of each of which are hereby incorporated by reference in their entirety.

TECHNICAL FIELD

The present invention relates to an input device that is equipped with a position input unit such as a touch pad that receives the designation of in-plane positions and supplies position signals that indicate the designated positions and that controls display in accordance with the position signals.

BACKGROUND ART

In recent years, portable apparatuses such as portable telephones and tablet terminals that are equipped with touch panels (in some cases referred to as touch screens) are being provided. A touch panel is a device that combines the functions of a display unit such as a liquid crystal display and a position input unit such as a touch pad that supplies position signals that indicate the touch positions of an indicator such as a finger within the screen.

In the above-described portable apparatuses, when a user touches a portion of the screen with a finger, the position input unit supplies a position signal that indicates the touch position of the finger on the screen. A control unit then controls the display of the display unit in accordance with the position signal from the position input unit.

FIG. 1 shows an example of the display of a screen. Referring to FIG. 1, a plurality of icons 101 is displayed on screen 100 of the display unit at a fixed spacing. A specific function such as the activation of an application is assigned to each of icons 101.

When the user touches the position of a desired icon 101 on screen 100 of the display unit with a finger, the position input unit supplies a position signal that indicates the touch position of the finger within screen 100, and based on this position signal, the control unit specifies icon 101 that corresponds to the touch position of the finger within screen 100. The control unit then both executes the function that is assigned to icon 101 that was specified and controls the display on screen 100.

However, if icon 101 is small with respect to the size of the finger, and moreover, if the spacing between icons 101 is narrow, then when a desired icon 101*a* is designated by the finger, for example as shown in FIG. 2, a portion of the touch area of the finger will cover adjacent icon 101*b*, and there will be consequently cases in which the control unit mistakenly recognizes adjacent icon 101*b* as the icon that is designated. In this case, a function will be executed that differs from the function desired by the user.

A touch panel that can solve the problem of erroneous designation of an icon is disclosed in Patent Document 1.

In the touch panel disclosed in Patent Document 1, the size of the icons is changed according to the touch area of a finger. More specifically, when the touch area of a finger is greater than the display area of an icon, the display area of the icon is made larger. By enlarging the icons, a user is able to reliably designate the desired icon by finger.

When a plurality of icons is displayed and the icons following enlargement are not accommodated within the screen, the icons following enlargement are displayed on a plurality of pages. At this time, the icons following enlargement are displayed rearranged in a predetermined order.

LITERATURE OF THE PRIOR ART

Patent Documents

Patent Document 1: Japanese Unexamined Patent Application Publication No. 2007-328421

SUMMARY OF THE INVENTION

In the touch panel described in Patent Document 1, because icons are displayed in predetermined positions at a fixed spacing, the designation of icons is in some cases problematic due to the manner in which the portable apparatus is held. For example, when the portable apparatus is held in one hand while icon 101*a* of screen 100 is designated by a finger of the other hand as shown in FIG. 3, the finger that is holding the portable apparatus may in some cases interfere with the designation of icon 101*a*.

In some cases, icons following enlargement are rearranged and displayed, and in such cases, the display positions of the icons before enlargement and after enlargement may change, and the user must therefore check one-by-one how the icons are displayed in the arrangement that follows enlargement. This checking procedure reduces ease of operation.

Still further, sunlight or light from an outside light source may in some cases interfere with the visibility of the icons as shown in FIG. 4. In such cases, designation of a desired icon becomes problematic. Although changing the orientation of the portable apparatus with respect to light may improve the visibility of icons, this operation of varying the orientation is troublesome for the user.

It is an object of the present invention to provide an input device, an image display method, and a program that allow a user to reliably designate icons and that feature superior ease of operation.

The input device of the present invention for achieving the above-described object includes:

a display unit that displays images on a screen;

a position input unit that receives the designation of in-plane positions with respect to the screen and supplies, as output, position signals that indicate the in-plane positions that were designated; and a control unit that, when a plurality of in-plane positions has been designated, based on the position signals, specifies each in-plane position and both displays a plurality of images at respective in-plane positions and controls the size of display of each image according to the spacing of each of the in-plane positions.

The image display method of the present invention includes:

a position input unit receiving the designation of in-plane positions with respect to the screen of the display unit and supplying, as output, position signals that indicate the in-plane positions that were designated;

when a plurality of in-plane positions has been designated, a control unit, based on the position signals, specifying each in-plane position and both displaying a plurality of images at the respective in-plane positions and controlling the size of display of each image according to the spacing of each of the in-plane positions.

The program of the present invention causes a computer to execute processes of:

receiving from an position input unit position signals that indicate each of a plurality of in-plane positions that were designated with respect to a screen; and based on the position signals, specifying the plurality of in-plane positions and both displaying a plurality of images at the respective in-plane positions and controlling the size of display of each image according to the spacing of each of the in-plane positions.

Figure 1:
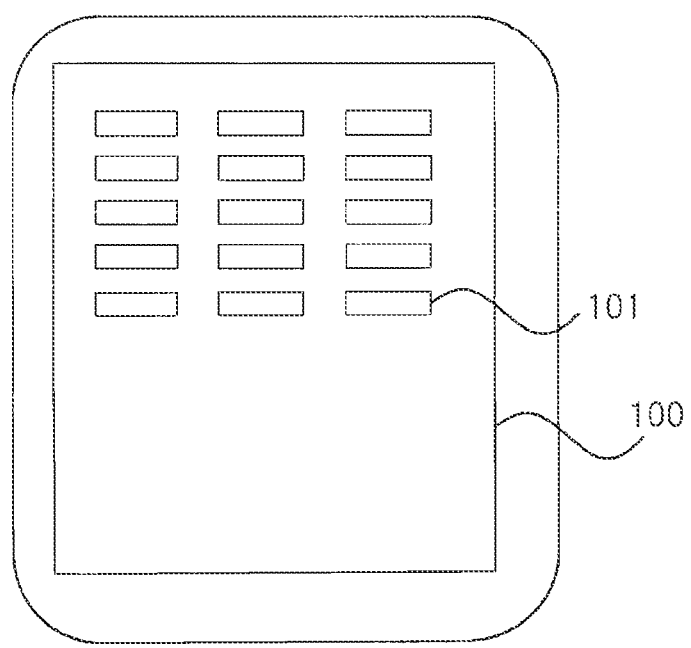
FIG. 1 is a schematic view showing an example of the display of icons.
Figure 2:
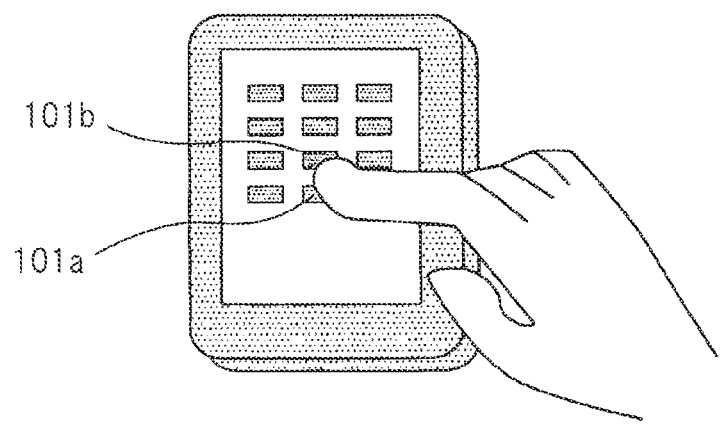
FIG. 2 is a schematic view for describing the erroneous designation of an icon.
Figure 3:
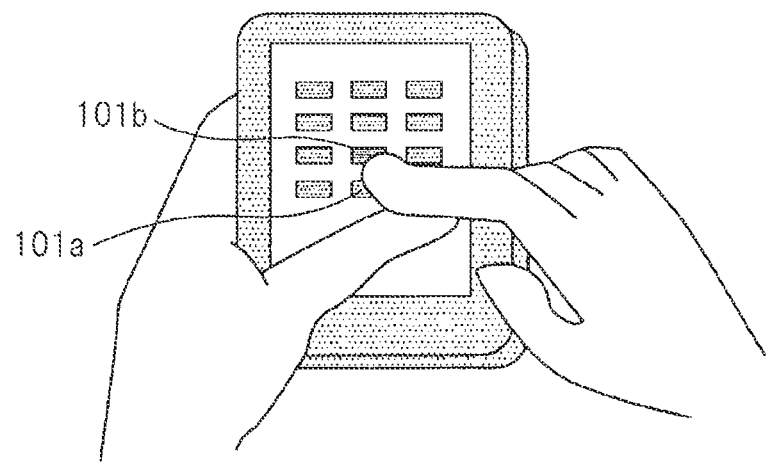
FIG. 3 is a schematic view showing a state in which a finger that is holding a portable apparatus interferes with the designation of an icon.

EXPLANATION OF REFERENCE NUMBERS 1 touch position/spacing calculation unit
2 display position/size calculation unit
3 display control unit
4 application execution unit
10 control unit
11 screen
12 touch pad
13 memory unit

BEST MODE FOR CARRYING OUT THE INVENTION

An exemplary embodiment of the present invention is next described with reference to the accompanying drawings.

Figure 5:
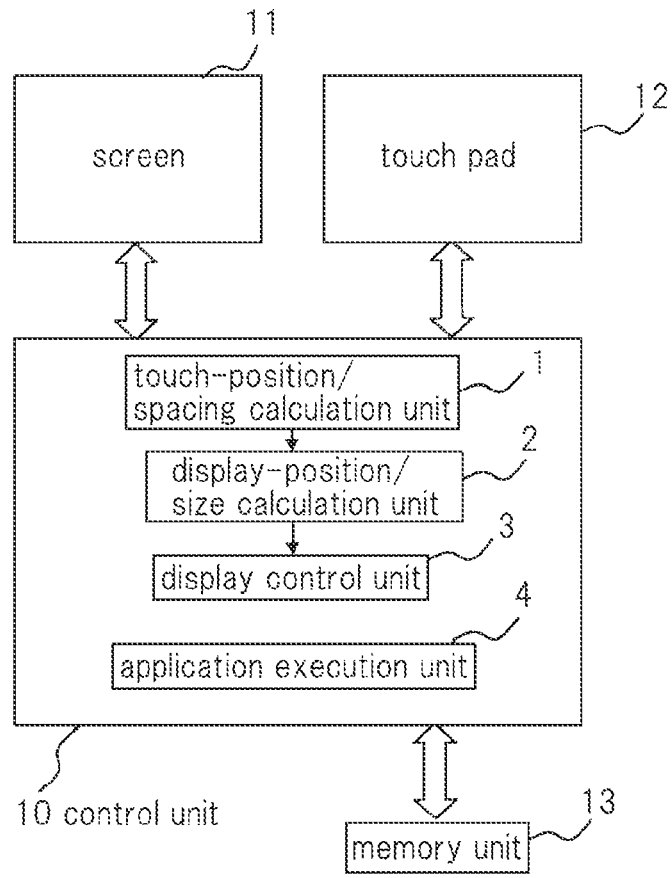
FIG. 5 is a block diagram showing the configuration of the input device that is an exemplary embodiment of the present invention.

FIG. 5 is a block diagram showing the configuration of the input device that is an exemplary embodiment of the present invention.

The input device shown in FIG. 5 includes screen 11 that is the display unit, touch pad 12 that is the position input unit, memory unit 13, and control unit 10. In FIG. 5, screen 11 and touch pad 12 are arranged side by side for the sake of convenience, but in actuality, screen 11 and touch pad 12 are arranged against each other. The in-plane positions (coordinates) of touch pad 12 and the in-plane positions (coordinates) of screen 11 have a one-to-one correspondence.

Screen 11 is, for example, a liquid crystal display, and displays a plurality of images (including images of icons) on the screen. Touch pad 12 receives the designation of in-plane positions to the screen and supplies, as output, position signals that indicate the in-plane positions that were designated. The construction in which screen 11 and touch pad 12 are combined is referred to as a touch panel.

Although there are a variety of types of touch pads 12 including the resistive type, the infrared type, and the capacitive type, the present exemplary embodiment can adopt any of these types. However, touch pad 12 is a device that is capable of multitouch, that can simultaneously detect touches to a plurality of sites on the screen, and that can supply position signals indicating each of these touch sites. In this case, the touch is to touch with an indicator such as a finger or a pen. The position signals are, for example, signals that indicate coordinates of touch sites on the screen.

Memory unit 13 is a storage device such as semiconductor memory and stores programs and data necessary for causing an input device to operate. The programs include a plurality of applications. The data include various types of data such as image data of icons. Memory unit 13 further stores an application/icon correspondence table in which applications and image data of icons are stored in association with each other.

Control unit 10 is a component that operates in accordance with a program that is stored in memory unit 13, controls the display of images such as icons of screen 11 based on position signals from touch pad 12, and executes functions (applications) that are assigned to icons that were designated.

Control unit 10 includes: touch-position/spacing calculation unit 1, display-position/size calculation unit 2, display control unit 3, and application execution unit 4.

Touch-position/spacing calculation unit 1 specifies the in-plane position (touch position of an indicator) on touch pad 12 that the user has designated by the indicator based on a position signal from touch pad 12. When a plurality of in-plane positions have been designated, touch-position/spacing calculation unit 1 both specifies each of the in-plane positions on touch pad 12 based on the position signals from touch pad 12 and calculates the spacing between each of the in-plane positions.

Display-position/size calculation unit 2 both determines the display positions on screen 11 that correspond to each of the in-plane positions on touch pad 12 that were specified by touch-position/spacing calculation unit 1 and, based on the spacing between each of the in-plane positions that was acquired by touch-position/spacing calculation unit 1, calculates the size of the image of each icon such that the images of adjacent icons do not overlap.

For example, if D is the spacing between the center of gravity (in-plane position) of a first touch area and the center of gravity (in-plane position) of a second touch area, then, with respect to the width of the image of the icon that is displayed in the first touch area, the width of the second-touch-area-side from the center of gravity of this image is set smaller than D/2. Similarly, with respect to the width of the image of the icon that is displayed in the second touch area, the width of the first touch-area side from the center of gravity of this image is set smaller than D/2.

The widths in the horizontal direction and vertical direction of the image of adjacent icons may be set to satisfy the conditions described below.

Figure 6:
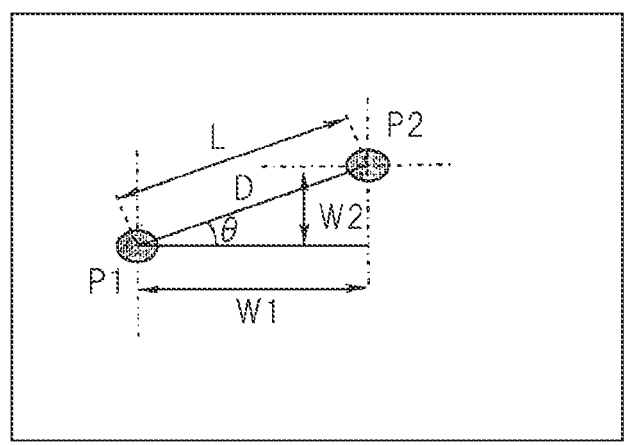
FIG. 6 is a view for describing the conditions of width in the horizontal direction and vertical direction for the images of adjacent icons.

As shown in FIGS. 6, P1 and P2 are two in-plane positions on touch pad 12. L is assumed to be the length of line D that joins the center of gravity of in-plane position P1 and the center of gravity of in-plane position P2 and θ is assumed to be the angle formed by line D and a line in the horizontal direction.

In the case described above, spacing W1 in the horizontal direction between the center of gravity of in-plane position P1 and the center of gravity of in-plane position P2 is given by L×cos θ. In addition, spacing W2 in the vertical direction between the center of gravity of in-plane position P1 and the center of gravity of in-plane position P2 is given by L×sin θ.

With respect to the width in the horizontal direction of the image of the icon that is displayed at in-plane position P1, the width on the side of in-plane position P2 from the center of gravity of in-plane position P1 is set smaller than W1/2. In addition, with respect to the width in the horizontal direction of the image of the icon that is displayed at in-plane position P2, the width on the side of in-plane position P1 from the center of gravity of in-plane position P2 is set smaller than W1/2. By means of these settings, overlap in the horizontal direction between the images of the icons that are displayed at in-plane positions P1 and P2 can be prevented.

With respect to the width in the vertical direction of the image of the icon that is displayed at in-plane position P1, the width on the side of in-plane position P2 from the center of gravity of in-plane position P1 is set smaller than W2/2. In addition, with respect to the width in the vertical direction of the image of the icon that is displayed at in-plane position P2, the width on the side of in-plane position P1 from the center of gravity of in-plane position P2 is set smaller than W2/2. By means of these settings, overlap in the vertical direction between the images of the icons displayed at in-plane positions P1 and P2 can be prevented.

Referring again to FIG. 5, display control unit 3 displays the images of predetermined icons at positions that are determined by display-position/size calculation unit 2 in a size that is determined by display-position/size calculation unit 2.

Based on position signals from touch pad 12, application execution unit 4 specifies, from among the images of icons that are displayed on screen 11, the image of the icon that is selected through a predetermined touch operation in which a user uses an indicator, and acquires the application that corresponds to the image of the icon that was specified from the application/icon correspondence table of memory unit 13. Application execution unit 4 then executes the application that was acquired.

The operation of the input device of the present exemplary embodiment is next described.

Figure 7:
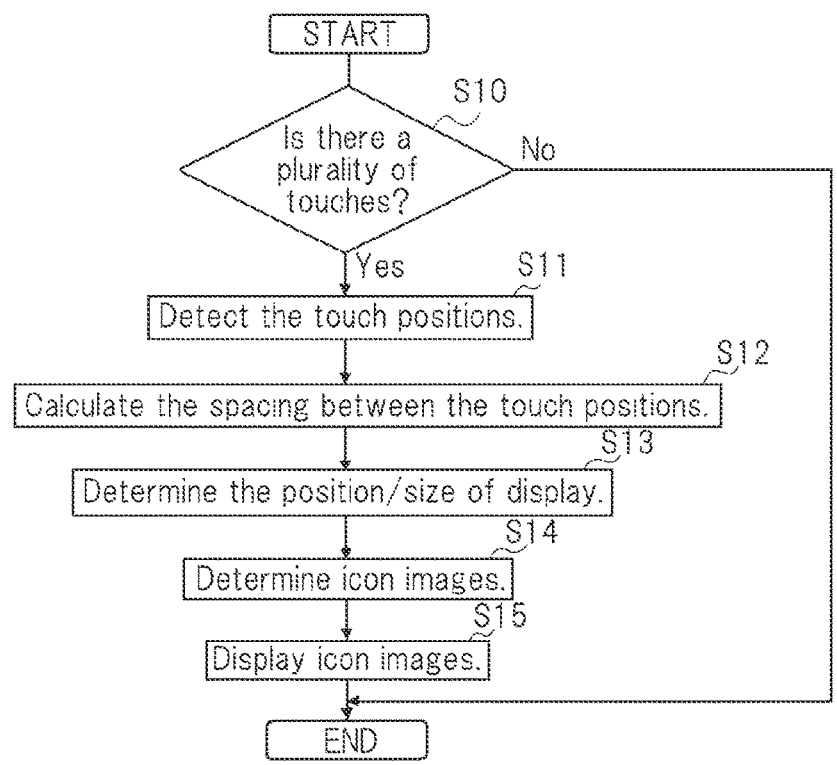
FIG. 7 is a flow chart showing one procedure of the process of displaying images of icons.

FIG. 7 shows the steps of the process of displaying images of icons. The display process is next described with reference to FIG. 5 and FIG. 7.

First, based on position signals from touch pad 12, touch-position/spacing calculation unit 1 judges whether a plurality of positions has been designated (Step S10). Here, the designation of a plurality of positions means not only a state in which a plurality of fingers simultaneously touch the screen, but also a state in which at least one finger touches a plurality of sites within a predetermined time interval. For example, two points may be designated by simultaneously touching the screen with the index finger and middle finger, or two points may be designated by the touch of the index finger to the screen followed by the touch of the middle finger to the screen within a predetermined time interval.

When the judgment result of Step S10 is "No," the display process ends.

If the judgment result of Step S10 is "Yes," touch-position/spacing calculation unit 1 next both detects each of the touch positions based on the position signals from touch pad 12 (Step S11) and calculates the spacing between these touch positions (Step S12).

Display-position/size calculation unit 2 next both determines the display position on screen 11 that corresponds to each touch position that was detected in Step S11 and determines the size of the images of the icons based on the spacing of the touch positions that was calculated in Step S12.

Display control unit 3 next determines each of the items of image data that are to be displayed at each display position in accordance with a predetermined order from among the image data of icons that is stored in memory unit 13 (Step S14). Here, the predetermined order is the order of priority ranked such that applications having a high frequency of execution are prioritized.

Finally, display control unit 3 displays images (images of icons) based on the image data that was selected on screen 11 based on the display positions and size that were determined in Step S13 (Step S15).

The images that are displayed and the display positions of the displayed images may be determined based on, for example, the positional relation of the touches. More specifically, when a plurality of sites are designated by a plurality of fingers, the assignment of images (images of icons) to display positions is implemented such that the images (images of icons) having higher priority are displayed more to the left side.

If, after an indicator such as a finger has been used to designate a plurality of positions within the screen and a plurality of images (images of icons) has been displayed, and if touch-position/spacing calculation unit 1 detects that indicator has been removed from the screen based on position signals from touch pad 12, display control unit 3 will maintain the display of images (images of icons) over a predetermined time interval from the timing of this detection. Thus, after a user has used an indicator such as a finger to designate a plurality of positions within the screen and after images (images of icons) will be displayed at each of the designated positions, the images (images of icons) are displayed over a fixed time interval even when the user removes the indicator from the screen. The user is therefore able to check and designate the images of the icons during this display interval.

The process of activating an icon is next described.

Figure 8:
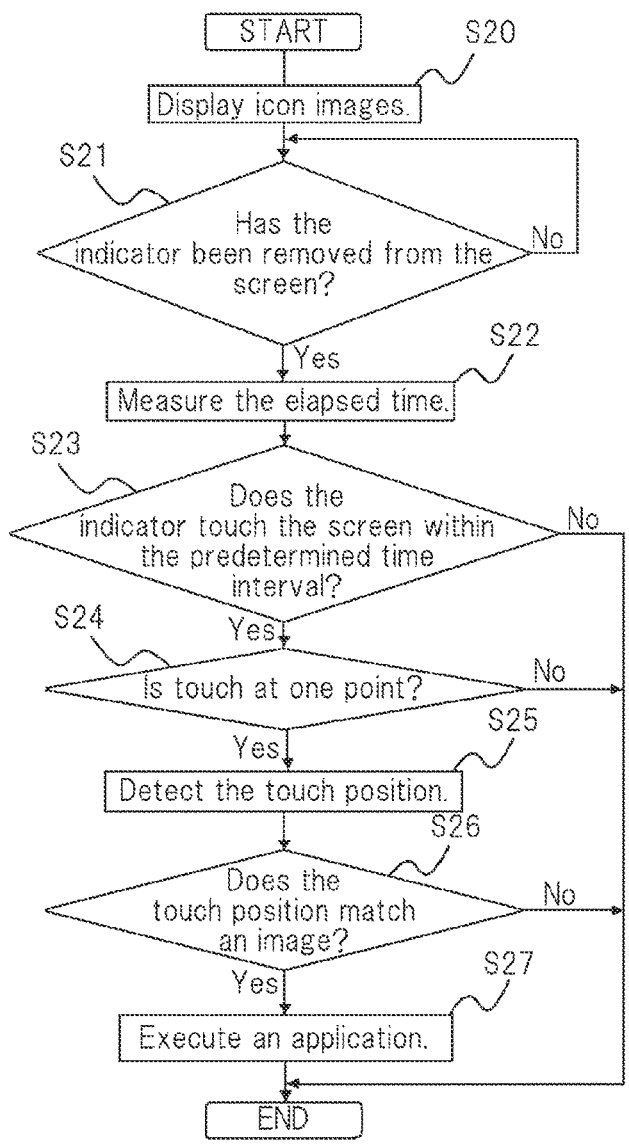
FIG. 8 is a flow chart showing the procedure of the activation process of an icon.

FIG. 8 shows the steps of the process of activating an icon.

When images of icons are displayed in the steps shown in FIG. 7 (Step S20), application execution unit 4 next judges whether the indicator has been removed from the screen based on the position signal from touch pad 12 (Step S21).

If the judgment result of Step S21 is "Yes," application execution unit 4 next measures the elapsed time from the time point that the indicator was removed from the screen (Step S22) and judges whether the indicator touched the screen within a predetermined time interval (Step S23).

If the judgment result of Step S23 is "No," the activation process ends.

If the judgment result of Step S23 is "Yes," application execution unit 4 next judges whether a touch has occurred at one point (Step S24).

If the judgment result of Step S24 is "No," this activation process ends. In this case, a plurality of touches was detected, whereby the processes of Steps S11-S15 of the process of displaying images of icons shown in FIG. 7 should be carried out. However, images having the next order of priority after the previously displayed images are determined as the images of icons that are to be displayed.

If the judgment result of Step S24 is "Yes," application execution unit 4 next, based on the position signal from touch pad 12, detects the designated position on screen 11 (Step S25). Application execution unit 4 then judges whether this detected position matches the display position of an image of an icon (Step S26).

When the judgment result of Step S26 is "No," this activation process ends.

When the judgment result of Step S26 is "Yes," application execution unit 4 acquires the application that is assigned to the image of the icon that matched the designated position from application/icon correspondence table of storage unit 13 and executes the application that was acquired (Step S27).

Figure 9:
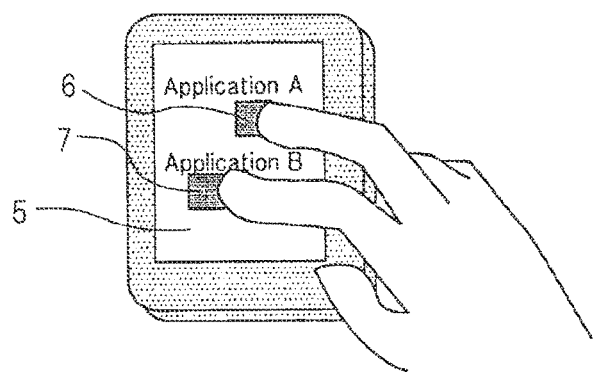
FIG. 9 is a schematic view showing an example of the display of images of icons.

According to the input device of the present exemplary embodiment described hereinabove, when a plurality of positions within the screen portion of screen 11 are designated by an indicator such as a finger, images of icons are displayed at these positions that were designated. For example, when two points within screen portion 5 of screen 11 are designated by the middle finger and index finger as shown in FIG. 9, icon images 6 and 7 are displayed at the respective designated positions. Accordingly, if display positions of the images of icons are designated by a middle finger and index finger to avoid fingers that are holding the case of the input device, the fingers that are holding the case of the input device will not interfere in the designation of the images of icons.

In addition, because the touch positions of fingers become the display positions of the images of icons without alteration, the user is able to recognize the display positions of images of icons based on the touch positions of his or her fingers. Since the arrangement of the display of the images of icons need not be perceived image by image, ease of operation is improved.

In addition, if the user knows the basis for the ranking (order of priority) of the images of icons or for the assignment to image display positions, the user will be able, to a certain degree, to anticipate the display positions of the images of icons.

Figure 4:
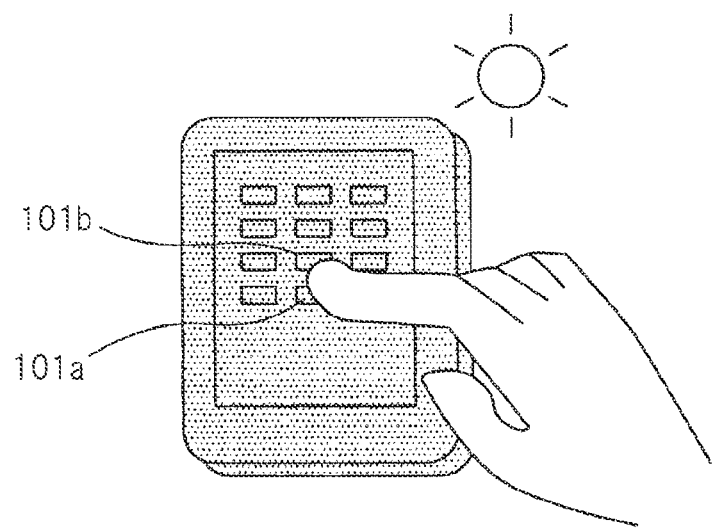
FIG. 4 is a schematic view showing a state in which light from the outside interferes with the designation of an icon.

Still further, even in a state in which light from the outside interferes with the visibility of images as shown in FIG. 4, the user is able to reliably recognize the positions of images that are displayed based on the touch positions of his or her finger.

Still further, the spacing between the user's middle finger and index finger that touch the screen becomes the spacing of icon images 6 and 7, whereby the user may touch the screen with his or her middle finger and index finger at a spacing that will not produce erroneous designation. In this way, the erroneous designation of icon images can be prevented.

The input device of the present exemplary embodiment described hereinabove is merely one example of the present invention and the configuration and operation of this input device can be modified as appropriate.

For example, in the example shown in FIG. 9, when the spacing between the touch position of the middle finger and the touch position of the index finger are adjusted in a state in which the middle finger and index finger touch the screen, control unit 10 may alter the display ranges of icon images 6 and 7 in accordance with this adjusted width. In this way, the display ranges of icon images 6 and 7 are made smaller if the spacing between the touch position of the middle finger and the touch position of the index finger is decreased, and the display ranges of icon images 6 and 7 are enlarged if the spacing between the touch position of the middle finger and the touch position of the index finger is increased.

In addition, screen 11 and touch pad 12 may be provided on the same side or on different sides. For example, screen 11 may be provided on a predetermined side (surface of the front side) of the case, and touch pad 12 may be provided opposite screen 11 on the surface of the side of the case that is opposite the surface on which screen 11 is provided (surface of the rear side).

Figure 10:
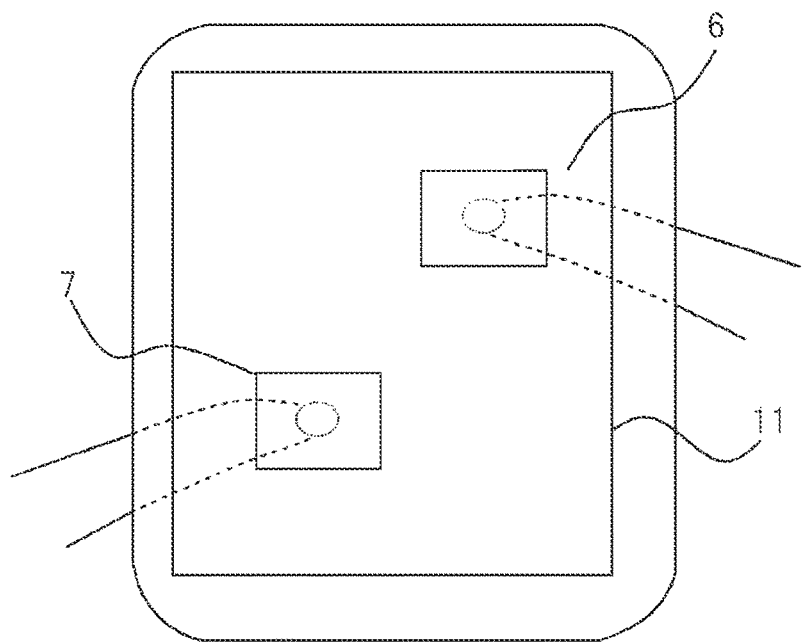
FIG. 10 is a schematic view showing an example of the display of images of icons when a touch pad is provided on the side opposite the surface on which the screen is provided.

In the case described above, the user designates a plurality of positions on touch pad 12 on the rear-surface side. For example, when two positions are designated on touch pad 12 on the rear surface side, icon images 6 and 7 are displayed at positions that correspond to these designated positions on screen 11, as shown in FIG. 10.

In a construction in which screen 11 and touch pad 12 are provided on different surfaces, the size of touch pad 12 may differ from that of screen 11. In this case, a coordinate conversion table that shows the correspondence relation between the in-plane positions (coordinates) of touch pad 12 and the in-plane positions (coordinates) of screen 11 is stored in memory unit 13. In control unit 10, this coordinate conversion table is consulted to convert in-plane positions (coordinates) of touch pad 12 to the in-plane positions (coordinates) of screen 11.

In addition, in a case in which a plurality of points in the screen of screen 11 are designated by an indicator, a control function may be assigned to an image that is displayed at the touch position of a predetermined point in order to control the display of images that are displayed at the touch positions of other points.

Specific operations are next described for a case in which an indicator is used to designate first to third points within a screen.

In control unit 10 shown in FIG. 5, touch-position/spacing calculation unit 1 both detects the touch of an indicator to first to third points of the screen and detects the order of these touches. Display-position/size calculation unit 2 determines the display positions from the first to third points and determines the size of the images based on the spacing between each point. Display control unit 3 then causes display, at the display position of the point for which the order of touch is a predetermined ordinal number, of an image to which a function is assigned to control the display at the display positions of the other points and then displays images of icons at the display positions of the other points.

Figure 11:
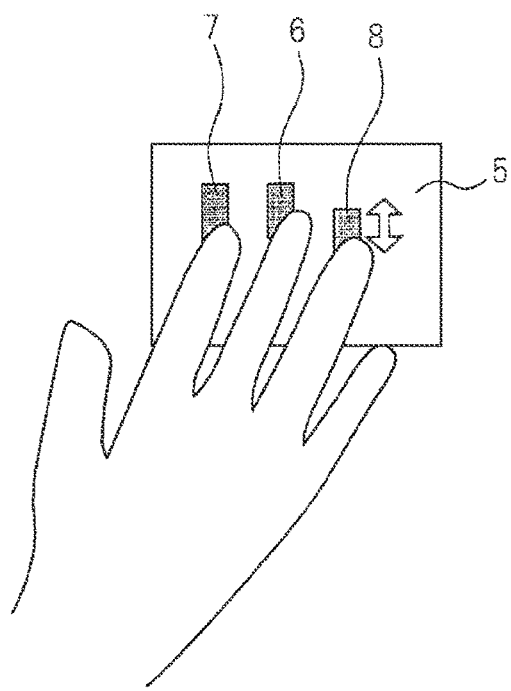
FIG. 11 is a schematic view showing an example of the display of an image to which a control function has been assigned.

Alternatively, when, following the designation of two points within screen portion 5 of screen 11 by the index finger and middle finger, another point within screen portion 5 is designated by the ring finger as shown in FIG. 11, the image to which the control function has been assigned is displayed at the point for which the order of touch was last. More specifically, in control unit 10 shown in FIG. 5, display control unit 3 both displays icon images 6 and 7 at the touch positions of the middle finger and index finger, respectively, and displays control image 8 at the touch position of the ring finger. Here, a function for changing the display of icon images 6 and 7 is assigned to control image 8.

When the ring finger is caused to slide in a state in which the index finger, middle finger, and ring finger touch screen portion 5, touch-position/spacing calculation unit 1 detects the direction of sliding and the amount of sliding of the ring finger on screen portion 5 based on the position signals from touch pad 12. Here, the first slide direction refers to causing control image 8 to slide upward, and the second slide direction refers to causing control image 8 to slide downward.

Display-position/size calculation unit 2 determines the display content of icon images 6 and 7 according to the direction of sliding and the amount of sliding that were detected. More specifically, when control image 8 is caused to slide a predetermined amount in the first slide direction, image data, that have the next order of priority after the image data that were being displayed until this time, are selected as icon images 6 and 7. Display control unit 3 then displays images based on the selected image data as icon images 6 and 7.

Although the display position for displaying the image that is assigned the control function is determined based on the touch order in the example described above, the present invention is not limited to this form. For example, the display position at which the image that has been assigned a control function is displayed may be determined according to the positional relation of touches. More specifically, when a plurality of points are designated by a plurality of fingers, the touch position that is located furthest to the right side on the screen may be taken as the display position for displaying the image that is assigned the control function.

Further, although images are displayed at display positions that correspond to the touch positions of an indicator in the input device of the present exemplary embodiment, the present invention is not limited to this form. Images may be displayed at positions that have a relative relation with the touch positions of the indicator.

In the terminal device of the present exemplary embodiment, control unit 10 may be a computer (CPU: Central Processing Unit) that operates in accordance with a program. The program is capable of causing a computer to execute: processes for controlling screen 11 and touch pad 12; a process of displaying at least images of icons; and a process of displaying an image to which a control function has been assigned. The program may be provided through the use of a recording medium such as an optical disk such as a CD (Compact Disk) or DVD, or USB (Universal Serial Bus) memory, or by way of a communication network (for example, the Internet).

The input device of the present invention can not only be applied to a terminal device such as a tablet terminal or portable telephone terminal, but can also be applied to an electronic apparatus that operates alone (for example, a game apparatus).

Although the present invention has been described with reference to an exemplary embodiment, the present invention is not limited to the above-described exemplary embodiment. The configuration and operation of the present invention are open to various modifications within a range that does not depart from the gist of the present invention that will be clear to one of ordinary skill in the art.

This application claims the benefits of priority based on Japanese Patent Application No. 2011-155719 for which application was submitted on Jul. 14, 2011 and incorporates by citation all of the disclosures of that application.

What is claimed is:

1. An input device comprising:
a display unit that displays images on a screen;
a position input unit that receives designations of in-plane positions with respect to said screen and supplies, as output, position signals that indicate the in-plane positions that were designated; and
a control unit that, when a plurality of in-plane positions have been designated, based on said position signals, specifies each in-plane position and both displays a plurality of icon images at respective said in-plane positions and controls the size of display of each icon image according to the spacing of each of said in-plane positions,
wherein said control unit obtains, with respect to two adjacent in-plane positions from among said plurality of in-plane positions, a spacing between a gravity center of one in-plane position and a gravity center of the other in-plane position, and, based on the spacing, sets a width of the other in-plane position side from the gravity center of the image displayed at said one in-plane position and a width of the one in-plane position side from the gravity center of the image displayed at said other in-plane position such that the images do not overlap.

2. The input device as set forth in claim 1, wherein said control unit displays an image, to which a function has been assigned to control display of other images that are displayed at other in-plane positions, at a specific in-plane position among said plurality of in-plane positions and controls the display content of said other images according to operations upon the image.

3. The input device as set forth in claim 1, further comprising:
a memory unit in which are stored a plurality of items of image data for which display has been ranked;
wherein said control unit determines, from among said plurality of items of image data, the image data of images that are to be displayed at each of said in-plane positions based on said ranking.

4. The input device as set forth in claim 1, wherein said position input unit is provided on a surface side on which said screen is formed.

5. The input device as set forth in claim 1, wherein said position input unit is provided on a first surface that is on a side opposite a second surface on which said screen has been formed.

6. An image display method comprising:
a position input unit receiving designations of in-plane positions with respect to a screen of a display unit and supplying, as output, position signals that indicate the in-plane positions that were designated; and
when a plurality of in-plane positions has been designated, a control unit, based on said position signals, specifying each in-plane position and both displaying a plurality of icon images at respective said in-plane positions and controlling the size of display of each icon image according to the spacing of each of said in-plane positions,
wherein said control unit obtains, with respect to two adjacent in-plane positions from among said plurality of in-plane positions, a spacing between a gravity center of one in-plane position and a gravity center of the other in-plane position, and, based on the spacing, sets a width of the other in-plane position side from the gravity center of the image displayed at said one in-plane position and a width of the one in-plane position side from the gravity center of the image displayed at said other in-plane position such that the images do not overlap.

7. A non-transitory computer-readable storage medium with a program used in a computer, said program for causing the computer to execute processes of:
receiving from a position input unit position signals that indicate each of a plurality of in-plane positions that were designated with respect to a screen; and
based on said position signals, specifying said plurality of in-plane positions and both displaying a plurality of icon images at respective in-plane positions and controlling the size of display of each icon image according to the spacing of each of said in-plane positions,
wherein a control unit obtains, with respect to two adjacent in-plane positions from among said plurality of in-plane positions, a spacing between a gravity center of one in-plane position and a gravity center of the other in-plane position, and, based on the spacing, sets a width of the other in-plane position side from the gravity center of the image displayed at said one in-plane position and a width of the one in-plane position side from the gravity center of the image displayed at said other in-plane position such that the images do not overlap.

* * * * *